(12) United States Patent
Kimura et al.

(10) Patent No.: US 8,493,416 B2
(45) Date of Patent: Jul. 23, 2013

(54) IMAGE PROCESSING APPARATUS, IMAGE PROCESSING METHOD, AND COMPUTER READABLE MEDIUM

(75) Inventors: Shunichi Kimura, Ashigarakami-gun (JP); Ikken So, Ashigarakami-gun (JP); Yutaka Koshi, Ashigarakami-gun (JP)

(73) Assignee: Fuji Xerox Co., ltd., Tokyo (JP)

( * ) Notice: Subject to any disclaimer, the term of this patent is extended or adjusted under 35 U.S.C. 154(b) by 937 days.

(21) Appl. No.: 12/608,479

(22) Filed: Oct. 29, 2009

(65) Prior Publication Data

US 2010/0271372 A1  Oct. 28, 2010

(30) Foreign Application Priority Data

Apr. 24, 2009  (JP) .................. 2009-105966

(51) Int. Cl.
*G06T 3/40* (2006.01)
(52) U.S. Cl.
USPC .......................... 345/667; 345/634; 382/299
(58) Field of Classification Search
USPC ................ 345/634, 667; 382/299; 348/240.2
IPC ......................................... G06T 3/4053,3/4069
See application file for complete search history.

(56) References Cited

U.S. PATENT DOCUMENTS 6,459,823 B2 * 10/2002 Altunbasak et al. .......... 382/299

FOREIGN PATENT DOCUMENTS

| EP | 0998122 A2 * | 6/2000 |
| JP | A-8-251397 | 9/1996 |
| JP | A-2006-202168 | 8/2006 |
| JP | A-2006-344002 | 12/2006 |
| JP | A-2007-257042 | 10/2007 |
| JP | A-2009-005119 | 1/2009 |

OTHER PUBLICATIONS

Elad et al.; "A Fast Super-Resolution Reconstruction Algorithm for Pure Translational Motion and Common Space-Invariant Blur" *IEEE Transactions on Image Processiong*; Aug. 2001; pp. 1187-1193; vol. 10, No. 8.
M. Elad, Y. Hel-Or, "A Fast Super-Resolution reconstruction algorithm for pure translational motion and common space-invariant blur", IEEE Transactions on Image Processing, USA, IEEE, Aug. 31, 2001, vol. 10, No. 8, p. 1187 to 1193.
Shigeki Sugimoto, Masatoshi Okutomi, "Process for obtaining super resolution images", Journal of the Robotics Society of Japan, Japan, The Robotics Society of Japan, Apr. 15, 2005, vol. 23, No. 3, p. 305 to 309 (with translation).
Dec. 25, 2012 Office Action issued in Japanese Patent Application No. 2009-105966 (with translation).

* cited by examiner

*Primary Examiner* — Jeffery A Brier
(74) *Attorney, Agent, or Firm* — Oliff & Berridge, PLC

(57) ABSTRACT

An image processor includes an image accepting unit, an image moving amount accepting unit, an initial estimated image generating unit, an estimated image moving and reducing unit, a unit extracting a difference between an image processed by the moving and reducing unit and the images accepted by the image accepting unit, a unit moving and enlarging, in the opposite direction of the moving and reducing unit, an image processed by the difference extracting unit, a unit adding and accumulating an image processed by the moving and enlarging unit, a unit multiplying a given coefficient by an image processed by the accumulative adding unit, and an iterating unit iterating processing by the moving and reducing unit, the difference extracting unit, the moving and enlarging unit, the accumulative adding unit and the coefficient multiplying unit according to a given condition.

18 Claims, 4 Drawing Sheets

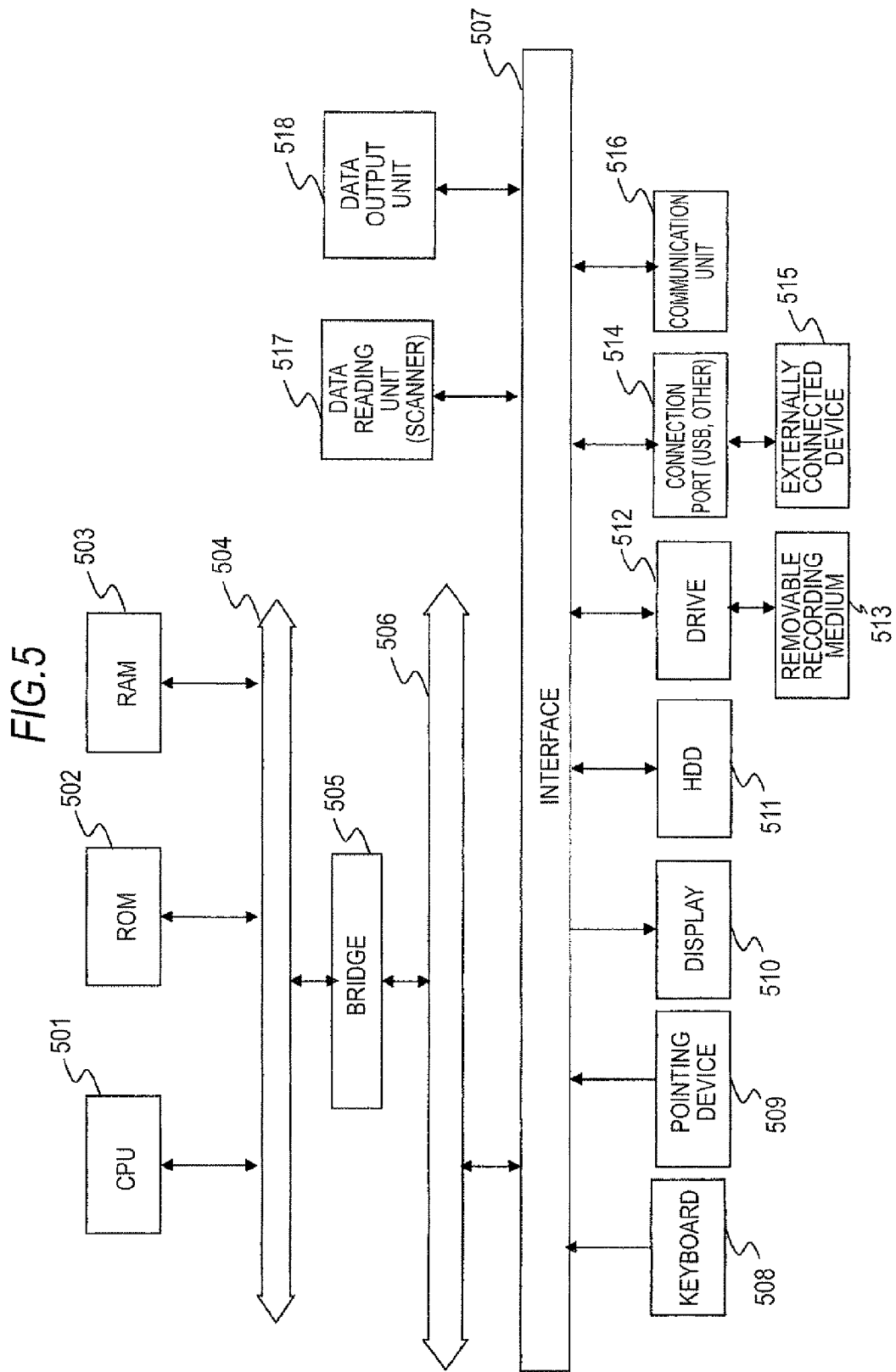

IMAGE PROCESSING APPARATUS, IMAGE PROCESSING METHOD, AND COMPUTER READABLE MEDIUM

CROSS-REFERENCE TO RELATED APPLICATIONS

This application is based on and claims priority under 35 USC 119 from Japanese Patent Application No. 2009-105966 filed Apr. 24, 2009.

BACKGROUND

1. Technical Field

The present invention relates to an image processing apparatus, an image processing method, and a computer readable medium.

2. Related Art

Processing that accepts a plurality of images that are mutually similar and reconstructs an image of higher resolution than those images is called super-resolution processing.

SUMMARY

According to an aspect of the invention, there is provided an image processing apparatus including: an image accepting unit that accepts a plurality of images; a moving amount accepting unit that accepts a moving amount of each image that has been accepted by the image accepting unit; an initial estimated image generating unit that generates an initial estimated image on the basis of the images that have been accepted by the image accepting unit and the moving amounts that have been accepted by the moving amount accepting unit; a moving and reducing unit that moves and reduces the initial estimated image; a difference extracting unit that extracts a difference image between an image that is a result of processing by the moving and reducing unit and the images that have been accepted by the image accepting unit; a moving and enlarging unit that moves and enlarges, in the opposite direction of the moving and reducing unit, the difference image that is a result of processing by the difference extracting unit; an accumulative adding unit that accumulates, and adds to an accumulated image and accumulates, an image that is a result of processing by the moving and enlarging unit; a coefficient multiplying unit that multiplies a coefficient determined beforehand by an image that is a result of processing by the accumulative adding unit; an iterating unit that uses an image that is a result of processing by the coefficient multiplying unit as the estimated image and causes processing by the moving and reducing unit, the difference extracting unit, the moving and enlarging unit, the accumulative adding unit and the coefficient multiplying unit to be iteratively performed in accordance with a condition determined beforehand; and an output unit that outputs an image that is a result of iterative processing by the iterating unit.

BRIEF DESCRIPTION OF THE DRAWINGS

Exemplary embodiments of the present invention will be described in detail based on the following figures, wherein:

FIG. 5 is a block diagram showing an example of the hardware configuration of a computer that realizes the exemplary embodiment.

DETAILED DESCRIPTION

Figure 1:
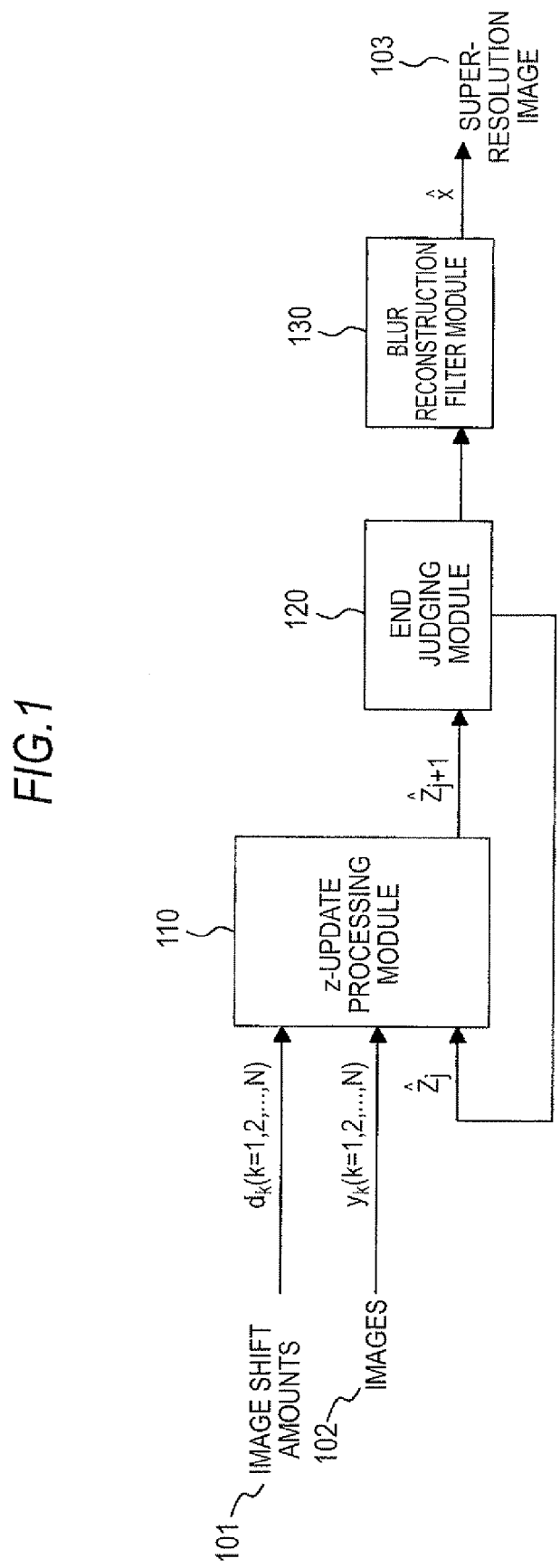
FIG. 1 is a conceptual module configuration diagram in regard to an example of the configuration of the exemplary embodiment.

Now, a description will be given of exemplary embodiments of the present invention with reference to the accompanying drawings.

1. General Method and High-Speed Method of Super-Resolution Processing

First, in order to facilitate understanding of the present exemplary embodiment, mainly the super-resolution processing described in "A Fast Super-Resolution Reconstruction Algorithm for Pure Translational Motion and Common Space-Invariant Blur" will be described. It will be noted that images, vectors, matrices and operators will be written in bold type in the numerical expressions.

1.1. General Method

First, general super-resolution processing that is not the high-speed method will be described. It will be noted that this general method is also described in "A Fast Super-Resolution Reconstruction Algorithm for Pure Translational Motion and Common Space-Invariant Blur".

(1) First, it will be assumed that there are N number of low-resolution images. These include images that are mutually similar.

(2) $y_k$ represents column vectors where these images are arranged 1-dimensionally in raster order. Here, $k=1, 2, \ldots, N$.

(3) $M_k$ represents numbers of pixels (numbers of dimensions of vectors) of these images $y_k$. That is, $M_k$=number of vertical pixels×number of horizontal pixels.

(4) x represents a high-resolution ideal image that is to be obtained (hereinafter also called "the ideal image").

(5) L represents a number of pixels of the ideal image x (number of dimensions of vector). That is, L=number of vertical pixels×number of horizontal pixels.

Here, it will be supposed that the ideal image x becomes the images $y_k$ that are geometrically warped, blurred, downsampled, have added noise and whose resolutions are low (i.e., whose numbers of pixels are small). Super-resolution processing uses this supposition to obtain the ideal image x. When this supposition is represented by an expression, it can be written as in expression (1).

$$y_k = D_k H_k F_k x + v_k \qquad (1)$$

Here, $F_k$ is an L×L matrix that represents the geometric warp of the image x. Here, geometric warp represents an affine transformation or projective transformation of an image and other shift and warp.

$H_k$ is an L×L matrix that represents the blur (linear time-variant filter).

$D_k$ is an $M_k$×L matrix that represents downsampling.

$v_k$ are L-dimension vectors whose autocorrelation matrix is as in expression (2) and which represent Gaussian additive measurement noise with zero mean.

$$W_k = E[v_k v_k^T] \qquad (2)$$

The Maximum-Likelihood estimation of x is done under the above conditions. Expression (3) of the estimated value is represented as in expression (4).

$$\hat{x} \quad (3)$$

$$\hat{x} = \underset{x}{\operatorname{argmin}}\left[\sum_{k=1}^{N}(y_k - D_k H_k F_k x)^T W_k^{-1}(y_k - D_k H_k F_k x)\right] \quad (4)$$

When expression (4) is solved, expression (5) is obtained.

$$R\hat{x} = p \quad (5)$$

$$R = \sum_{k=1}^{N}(F_k^T H_k^T D_k^T W_k^{-1} D_k H_k F_k)$$

$$p = \sum_{k=1}^{N}(F_k^T H_k^T D_k^T W_k^{-1} y_k)$$

In expression (5), generally the number of dimensions of x is large and it is difficult to directly solve the equation of expression (5), so a convergence operation is performed by the method of iteration (method of steepest descent) shown in expression (6). It will be noted that μ is a coefficient that controls convergence speed.

$$\hat{x}_{j+1} = \hat{x}_j + \mu(p - R\hat{x}_j) \quad (6)$$

If R is nonsingular, expression (6) is guaranteed to converge to a unique solution provided that μ is a sufficiently small positive value.

When expression (6) is transformed using expression (5), expression (7) is obtained.

$$\hat{x}_{j+1} = \hat{x}_j + \mu \sum_{k=1}^{N}[F_k^T H_k^T D_k^T W_k^{-1}(y_k - D_k H_k F_k \hat{x}_j)] \quad (7)$$

Ordinarily the additive noise is assumed to be white noise with the same distribution, that is, expression (8) (where I is a unit matrix), and expression (9) is used.

$$W_k = \sigma^2 I \quad (8)$$

where I is a unit matrix.

$$\hat{x}_{j+1} = \hat{x}_j + \mu \sum_{k=1}^{N}[F_k^T H_k^T D_k^T(y_k - D_k H_k F_k \hat{x}_j)] \quad (9)$$

In expression (9), a new coefficient μ including σ is defined. That is, μ'=μ/σ² and μ' is rewritten to μ.

1.2. High-Speed Method

In the preceding general method, multiple iterations are necessary and the operation amount of R and p necessary for a single iteration is large, so the total operation amount ends up becoming large.

Thus, with the high-speed method described in "A Fast Super-Resolution Reconstruction Algorithm for Pure Translational Motion and Common Space-Invariant Blur", there is proposed a method that is calculable at a high speed by placing limits on geometric warp, blur and downsampling.

Limiting Condition 1: First, the geometric warp is limited to just parallel shift.

Limiting Condition 2: Moreover, it is assumed that the blur is constant with respect to different input images and different image portions (linear time-invariant). That is, expression (10) is assumed.

$$H_k = H \quad (10)$$

Limiting Condition 3: Parallel shift of the geometric warp is limited to integer motion. It will be noted that this corresponds to performing geometric transformation by the nearest neighbour algorithm.

Limiting Condition 4: Further, a limitation assuming that the downsampling rate is constant (i.e., expression (11)) is made.

$$D_k = D \quad (11)$$

From these limiting conditions, when expression (9) is transformed, expression (12) is obtained.

$$\hat{x}_{j+1} = \hat{x}_j + \mu \sum_{k=1}^{N}[F_k^T H^T D^T(y_k - DH_k F \hat{x}_j)] \quad (12)$$

Here, from limiting condition 1 and limiting condition 2, it can be shown that $F_k$ and H are commutative. Utilizing this to perform transformation, expression (13) is obtained.

$$\hat{x}_{j+1} = \hat{x}_j + \mu H^T \sum_{k=1}^{N}[F_k^T D^T(y_k - DF_k H \hat{x}_j)] \quad (13)$$

Moreover, multiplying both sides with H from the left, expression (15) is obtained assuming expression (14).

$$\hat{z}_j = H\hat{x}_j \quad (14)$$

$$\hat{z}_{j+1} = \hat{z}_j + \mu HH^T(\tilde{p} - \tilde{R}\hat{z}_j)$$

$$\tilde{p} = \sum_{k=1}^{N}(F_k^T D^T y_k) \quad (15)$$

$$\tilde{R} = \sum_{k=1}^{N}(F_k^T D^T DF_k)$$

Expression (15) converges into expression (16).

$$\hat{z} = \tilde{R}^{-1}\tilde{p} \quad (16)$$

Moreover, expression (17) becomes a diagonal matrix using limiting condition 3 and limiting condition 4. The inverse matrix of a diagonal matrix can be easily determined, so expression (16) can be calculated at an extremely high speed.

$$\tilde{R} \quad (17)$$

This ends description of the super-resolution processing described in "A Fast Super-Resolution Reconstruction Algorithm for Pure Translational Motion and Common Space-Invariant Blur".

2. Problem in the Present Exemplary Embodiment

The general method has a large processing load.

On the other hand, the high-speed method has a lot of limiting conditions. That is, applying limiting condition 3 (limiting parallel shift of the geometric warp to integer motion) as mentioned before corresponds to performing enlargement by the nearest neighbour algorithm. In comparison to other methods that allow more precise motion than integers, such as linear interpolation and cubic convolution, image quality ends up becoming low in enlargement using the nearest neighbour algorithm.

Further, when limiting condition 4 (constant downsampling rate) is imposed as described previously, only images with the same reduction ratio may be used and the flexibility of the method is lost.

Moreover, in the high-speed method, when expression (17) of the matrix is singular matrix, the inverse matrix of expression (17) cannot be determined and sometimes expression (16) cannot actually be solved.

Thus, the present exemplary embodiment does not impose the limitation that parallel shift of the geometric warp is limited to integer motion. Further, the present exemplary embodiment does not impose the limitation of a constant downsampling rate. Further, the matrix of expression (17) is made nonsingular. In addition, the present exemplary embodiment presents a method that can alleviate the processing load over the general method.

3. Exemplary Embodiment 3.1. Thinking of the Present Exemplary Embodiment

In the present exemplary embodiment, the preceding limiting condition 3 and limiting condition 4 are not imposed. Thus, image quality and flexibility are ensured.

Limiting condition 1 and limiting condition 2 become reasonable preconditions when images are acquired with a scanner, so they become used as they are. That is, when an image of a paper document is acquired with a scanner, it can be assumed that the only geometric warp is the position of the paper shifting up, down, left or right. Further, it can be assumed that the degree of blur is constant over the entire surface of the scanner.

When limiting condition 3 and limiting condition 4 are not used, expression (9) becomes expression (18).

$$\hat{z}_{j+1} = \hat{z}_j + \mu HH^T(\tilde{p} - \tilde{R}\hat{z}_j) \tag{18}$$

$$\tilde{p} = \sum_{k=1}^{N} (F_k^T D^T y_k)$$

$$\tilde{R} = \sum_{k=1}^{N} (F_k^T D_k^T D_k F_k)$$

Expression (18) converges to expression (20), which satisfies expression (19), so it suffices to solve expression (21).

$$\tilde{R}\hat{z} = \tilde{p} \tag{19}$$

$$\hat{z} \tag{20}$$

$$\tilde{R}\hat{z} = \tilde{p} \tag{21}$$

$$\tilde{p} = \sum_{k=1}^{N} (F_k^T D_k^T y_k)$$

$$\tilde{R} = \sum_{k=1}^{N} (F_k^T D_k^T D_k F_k)$$

Here, in order to solve expression (21), the nonsingularity of expression (17) becomes a problem. Expression (21) converges to a single solution provided that expression (17) is nonsingular. However, if expression (17) is singular, the solution of expression (21) comes to include indefinite pixel values and converges to one of several solutions. For example, expression (17) becomes singular when the number of accepted images N is small and when the magnification ratio is large.

Thus, in the present exemplary embodiment, a general constraint clause using the prior information that an image is smooth is applied to make expression (17) nonsingular.

Expression (21) can be regarded as being the result of solving expression (22).

$$\hat{z} = \underset{z}{\operatorname{argmin}}\left[\sum_{k=1}^{N}(y_k - D_k F_k z)^T(y_k - D_k F_k z)\right] \tag{22}$$

Here, operator C, which represents prior knowledge, is introduced to minimize the result of applying expression (23) as the constraint clause representing image smoothness (operator C is an operator having a high-pass characteristic).

$$\frac{\beta}{2}\|Cz\|^2 \tag{23}$$

That is, expression (24) becomes solved.

$$\hat{z} = \underset{z}{\operatorname{argmin}}\left[\sum_{k=1}^{N}(y_k - D_k F_k z)^T(y_k - D_k F_k z) + \beta\|Cz\|^2\right] \tag{24}$$

When expression (24) is solved, expression (25) is obtained.

$$\tilde{\tilde{R}}\hat{z} = \tilde{p} \tag{25}$$

$$\tilde{p} = \sum_{k=1}^{N}(F_k^T D_k^T y_k)$$

$$\tilde{\tilde{R}} = \sum_{k=1}^{N}(F_k^T D_k^T D_k F_k) + \beta C^T C$$

Here, the reason that expression (26) in expression (25) does not, in contrast to what is described in "A Fast Super-Resolution Reconstruction Algorithm for Pure Translational Motion and Common Space-Invariant Blur", become a diagonal matrix is because limiting condition 3 and limiting condition 4 are removed or because the constraint clause is introduced. Thus, in the present exemplary embodiment, an iterative operation is employed.

$$\tilde{\tilde{R}} \tag{26}$$

That is, an iterative operation is performed in expression (27). It will be noted that $\mu\beta = \nu$ in expression (27).

$$\begin{aligned}\hat{z}_{j+1} &= \hat{z}_j + \mu\left(\tilde{p} - \tilde{\tilde{R}}\hat{z}_j\right) \\ &= \hat{z}_j + \mu\left\{\sum_{k=1}^{N}[F_k^T D_k^T(y_k - F_k D_k \hat{z}_j)] - \beta C^T C \hat{z}_j\right\} \\ &= \hat{z}_j + \mu\sum_{k=1}^{N}[F_k^T D_k^T(y_k - F_k D_k \hat{z}_j)] - \nu C^T C \hat{z}_j\end{aligned} \tag{27}$$

Moreover, expression (28) is used as a transform $S_k$ that simultaneously performs geometric warp and downsampling.

$$S_k = D_k F_k \tag{28}$$

When expression (27) is transformed using expression 28, expression (29) is obtained.

$$\hat{z}_{j+1} = \hat{z}_j + \mu(\tilde{p} - \tilde{R}\hat{z}_j) \quad (29)$$
$$= \hat{z}_j + \mu \sum_{k=1}^{N} [S_k^T(y_k - S_k \hat{z}_j)] - \nu C^T C \hat{z}_j$$

The present exemplary embodiment uses expression (29) to decide a super-resolution image.

Here, it suffices to use expression (30) when the prior knowledge operator C is not used.

$$\hat{z}_{j+1} = \hat{z}_j + \mu \sum_{k=1}^{N} [S_k^T(y_k - S_k \hat{z}_j)] \quad (30)$$

Or, an operator $G_k$ that enlarges an image may be used instead of expression (31) for the purpose of even smoother image generation. The operator $G_k$ that enlarges an image represents operation that performs enlargement using, for example, a bilinear (linear interpolation) method or a bicubic (cubic convolution) method. Expression (31) is a zero-fill+ enlargement operation, so it lacks smoothness.

$$D_k^T \quad (31)$$

A smooth convergence value can be obtained by adding normal enlarged pixel values rather than zero-fill. In this case, expression (29) becomes expression (32), and expression (30) becomes expression (33).

$$\hat{z}_{j+1} = \hat{z}_j + \mu \sum_{k=1}^{N} [F_k^T G_k(y_k - S_k \hat{z}_j)] - \nu C^T C \hat{z}_j \quad (32)$$

$$\hat{z}_{j+1} = \hat{z}_j + \mu \sum_{k=1}^{N} [F_k^T G_k(y_k - S_k \hat{z}_j)] \quad (33)$$

3.2. Exemplary Embodiment

First, an exemplary embodiment using expression 29 will be described.

3.2.1. Overall Configuration of Exemplary embodiment

An example of a preferred exemplary embodiment when realizing the present invention will be described below on the basis of the drawings.

FIG. 1 shows a conceptual module configuration diagram in regard to an example of the configuration of the present exemplary embodiment.

It will be noted that modules will generally refer to logically isolatable parts of software (a computer program) or hardware. Consequently, modules in the present exemplary embodiment will refer not only to modules in a computer program but also modules in a hardware configuration. Therefore, the present exemplary embodiment will combine descriptions of a computer program, a system and a method. For convenience of description, "store", "causes to store" and phrases equivalent to these will be used, but these phrases will, when the exemplary embodiment is a computer program, mean to cause a storage device to store or to control so as to cause a storage device to store. Further, module will have an almost one-to-one correspondence with function, but in implementation, one module may be configured by one program, several modules may be configured by one program, and conversely one module may be configured by several programs. Further, several modules may be executed by one computer, or one module may be executed in several computers by computers in dispersed or parallel environments. It will be noted that another module may also be included in one module. Further, "connection" will be used below in cases of physical connection and also logical connection (data exchange, instruction, inter-data reference relationship, etc.).

Further, a system or apparatus is configured as a result of plural computers, hardware, apparatus and the like being interconnected by communicating means such as a network (including one-to-one correspondence communication connections), and there are also cases where these are realized by a single computer, piece of hardware, apparatus or the like. "Apparatus" and "system" will be used as mutually synonymous terms. "Determined beforehand" will mean determined before processing that is under discussion and will be used, before processing by the present exemplary embodiment starts as well as after processing by the present exemplary embodiment starts, to include the meaning of determined in response to the situation/state at that time or in response to the situation/state up until that time.

Here, it will be assumed that image alignment is being performed by some kind of method. For example, a position where there are few differences may be searched for by pattern matching and the images may be aligned with that position.

Alignment in sub-pixel units with respect to a reference image (e.g., $y_1$) is performed.

Here, image shift vectors $d_k$ are used.

It will be assumed that the vectors $d_k$ are 2-dimensional vectors and are amounts that most closely match the reference image when the accepted images $y_k$ are moved $d_k$ in a 2-dimensional space.

The module configuration example of the exemplary embodiment shown in FIG. 1 includes a z-update processing module 110, an end judging module 120 and a blur reconstruction filter module 130.

The z-update processing module 110 is connected to the end judging module 120. The z-update processing module 110 accepts images 102 ($y_k$) and image shift amounts 101 ($d_k$) of those images 102. The images 102 are a plurality of images. The image shift amounts 101 are shift amounts corresponding to each of the images 102.

The z-update processing module 110 uses the images 102 and the image shift amounts 101 to update an estimated image represented by expression (34) and determine an estimated image represented by expression (35).

$$\hat{z}_j \quad (34)$$

$$\hat{z}_{j+1} \quad (35)$$

Here, when j=0, there is no estimated image represented by expression (36), so the images 102 and the image shift amounts 101 are used to generate an estimated image represented by expression (36) inside the z-update processing module 110. It is acceptable if expression (36) is an arbitrary pixel value, and the estimated image is generated using expression (37), for example.

$$\hat{z}_0 \quad (36)$$

$$\hat{z}_0 = \frac{1}{N} \sum_{k=1}^{N} (F_k^T G_k y_k) \quad (37)$$

$G_k$ represents an operator that performs image enlargement processing with respect to each accepted image $y_k$. $G_k$ is processing that performs enlargement until each accepted image $y_k$ becomes the same size as a super-resolution image $103x$ that is outputted. Further, expression (49) is operation that shifts the pixel positions to their original positions using the image shift amounts 101.

$$F_k^T \qquad (49)$$

The preceding initial value is obtained by aligning the enlarged images of the accepted images and calculating an average value, and it can be used as an estimated initial value of the ideal image.

The end judging module 120 is connected to the z-update processing module 110 and the blur reconstruction filter module 130. When the end judging module 120 judges to end the loop (repetition of processing by the z-update processing module 110), the end judging module 120 delivers an image of the output of expression (35) to the blur reconstruction filter module 130. Further, when the end judging module 120 judges that it is not the end, the end judging module 120 delivers the output image (expression (35)) of the z-update processing module 110 to the z-update processing module 110 as the estimated image (expression (34)) with respect to the next processing.

The loop ends provided that, for example, expression (38), which is a correction term of expression (29), is smaller than a threshold value determined beforehand.

$$\mu \sum_{k=1}^{N} [S_k^T(y_k - S_k \hat{z}_j)] - \nu C^T C \hat{z}_j \qquad (38)$$

Expression (38) is a vector, so the loop ends when expression (38) is equal to or less than a threshold value in comparison to a threshold value determined beforehand as an absolute value sum or sum of squares of the vector element or the maximum value of the absolute value of the element or the like.

Or, it suffices to use a general method such as "the loop ends provided that the degree of improvement of the correction term of expression (29) is equal to or less than a threshold value determined beforehand".

Or, a number of times of the loop may be determined beforehand and the loop may be ended when processing of the number of times determined beforehand is performed.

The blur reconstruction filter module 130 is connected to the end judging module 120. The blur reconstruction filter module 130 receives the image of expression (35) (i.e., the image that is the result of iterative processing by the z-update processing module 110) from the end judging module 120, administers processing that enhances high frequency region, and outputs the super-resolution image 103 (expression (3)) to the outside. As the processing that enhances high frequency region, there is blur reconstruction processing. Provided that the PSF (Point Spread Function) of blur is understood, it suffices for the blur reconstruction filter module 130 to apply the inverse function thereof. Or, the blur reconstruction filter module 130 may apply another high-frequency region enhancement filter. The blur reconstruction filter module 130 can also use another general reconstruction method.

Or, assuming that the extent of blur is small, processing may be omitted. In this case, the blur reconstruction filter module 130 outputs the image received from the end judging module 120 to the outside.

3.2.2. Detailed Example of z-Update Processing Module 110

Next, more specific processing content of the z-update processing module 110 will be described.

The z-update processing module 110 performs calculation of expression (29).

Figure 2:
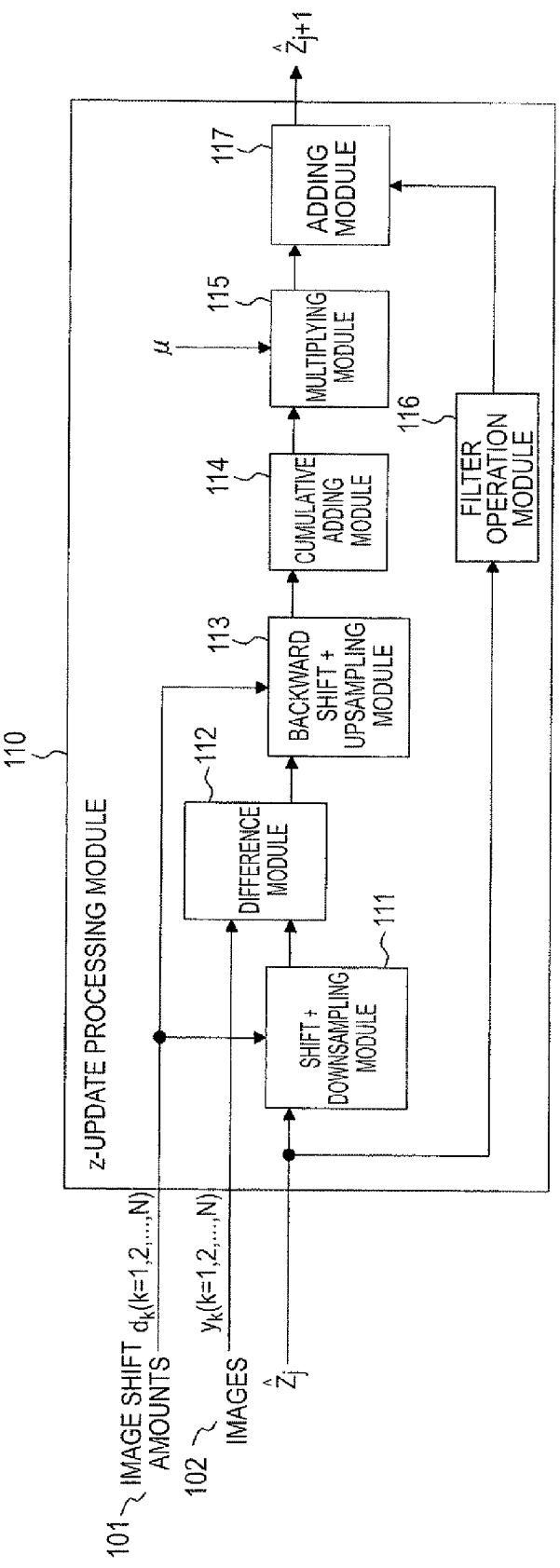
FIG. 2 is a conceptual module configuration diagram in regard to an example of the configuration of the inside of a z-update processing module.

FIG. 2 is a conceptual module configuration diagram in regard to an example of the configuration of the inside of the z-update processing module 110.

The z-update processing module 110 has a shift+downsampling module 111, a difference module 112, a backward shift+upsampling module 113, an accumulative adding module 114, a multiplying module 115, a filter operation module 116 and an adding module 117.

Here, the portion relating to generation of the initial value (expression (36)) of z is omitted.

Further, here, it will be assumed that the ratio (or enlargement factor) of resolution between the image after super-resolution processing and the accepted images $y_k$ is constant.

The shift+downsampling module 111 is connected to the difference module 112. The shift+downsampling module 111 receives the image shift amounts 101 and performs shift processing and reduction processing (also called downsampling processing) of the estimated image (expression (34)). This corresponds to the processing of operator $S_k$ of expression (29). In the present processing, an image of a number of pixels $M_k$ is generated from the image (expression (34)) of a number of pixels L. More specifically, the pixel values of the images (expression (34)) are used to generate and output pixel values of pixel grid positions of the images $y_k$.

Figure 3:
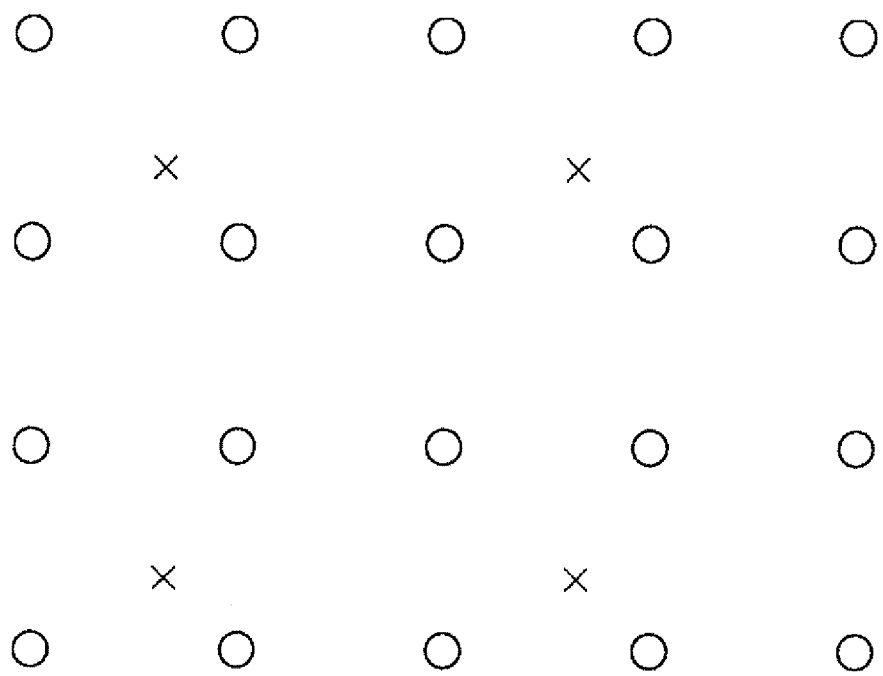
FIG. 3 is an explanatory diagram showing an example of processing by a shift+downsampling module.

The enlargement factor and the shift amounts of the accepted images are known, so the positional relationship between the pixel grid of the image (expression (34)) and the pixel grid of the image $y_k$ is uniquely determined. The number of pixels of the image (expression (34)) is equal to or greater than the number of pixels of the image $y_k$, so the relative positional relationship becomes as shown in the example of FIG. 3. FIG. 3 is an explanatory diagram showing an example of processing by the shift+downsampling module 111.

In FIG. 3, "o" represent the pixel grid of the image (expression (34)) and "x" represent the pixel grid of the image $y_k$.

Now, the pixel values of o are to be used to determine the pixel values of the positions of x. This operation can, for example, be determined by 2-dimensional linear interpolation processing.

For example, the pixel values of the pixel grid positions of the image $y_k$ can be generated using four pixel values of the image (expression (34)) surrounding a pixel grid position x of the image $y_k$.

Figure 4:
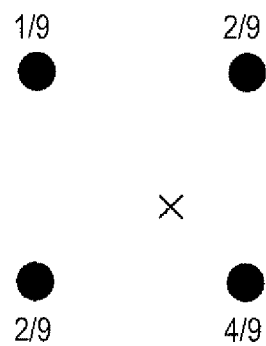
FIG. 4 is an explanatory diagram showing an example of processing by the shift+downsampling module.

More specifically, as shown in the example of FIG. 4, the pixel value of a position of x is determined using four pixels (black circles) surrounding the grid position x. FIG. 4 is an explanatory diagram showing an example of processing by the shift+downsampling module 111.

For example, in linear interpolation processing, weighted addition is performed in accordance with the position of x. In the example of FIG. 4, weighting of 1/9 (top left pixel), 2/9 (top right pixel), 2/9 (bottom left pixel) and 4/9 (bottom right pixel) is applied. The weighting factor is generated in accordance with an interpolation algorithm.

In linear interpolation processing, it suffices to use four surrounding pixel values, and in cubic convolution processing, it suffices to use sixteen surrounding pixel values. When using projection, it suffices to use nine surrounding pixel values provided that the enlargement scale factor is 2. If the enlargement scale factor is 3, it suffices to use sixteen surrounding pixel values. As this interpolation method, various methods can be used.

An image with the same number of pixels as the image $y_k$ is generated by the shift+downsampling module 111.

The difference module 112 is connected to the shift+downsampling module 111 and the backward shift+upsampling module 113. The difference module 112 calculates a difference value between the image received from the shift+downsampling module 111 and the image 102 ($y_k$). In other words, the difference module 112 performs the processing of expression (39).

$$y_k - S_k \hat{z}_j \quad (39)$$

The backward shift+upsampling module 113 is connected to the difference module 112 and the accumulative adding module 114. The backward shift+upsampling module 113 receives the image shift amount 101, enlarges (also called upsampling processing) the difference result resulting from the difference module 112, and returns it to the number of pixels of the image (expression (34)). In other words, the backward shift+upsampling module 113 moves and enlarges the image that is the result of processing by the difference module 112 in the opposite direction of the shift+downsampling module 111.

The backward shift+upsampling module 113 performs the processing of operator expression (40) when using expression (29) or expression (30). In operator expression (40), the opposite processing of operator $S_k$ is performed.

$$S_k^T \quad (40)$$

In the example shown in FIG. 4, in operator $S_k$, weighted addition from the black circles to x is performed, but in operator expression (40), processing that disperses the pixel value of x from x to the black circles is performed. That is, the initial values of the pixel values of the black circles are made 0, and the pixel value of x is multiplied by the weighting factor (which is the same as during downsampling) to add the weighting factor to the pixel values of the black circles. If there are plural x pixels around a certain black circle, the addition values with which that weighting factor has been multiplied become the final output values of the backward shift+upsampling module 113.

The processing result of the backward shift+upsampling module 113 can be obtained for each k.

The accumulative adding module 114 is connected to the backward shift+upsampling module 113 and the multiplying module 115. The accumulative adding module 114 adds the processing results of the backward shift+upsampling module 113. In other words, the accumulative adding module 114 adds to an accumulated image and accumulates, the image that is the result of processing by the backward shift+upsampling module 113. For example, the accumulative adding module 114 initially stores, in a storage device (memory, hard disk, etc.) inside the accumulative adding module 114, the image that is the processing result of the backward shift+upsampling module 113, and from the next time on, the accumulative adding module 114 adds the image that has been stored and the image that is the processing result of the backward shift+upsampling module 113 and stores the image that is that addition result in the storage device. Of course, the accumulative adding module 114 may also be configured to store beforehand an image where each pixel value is zero in the storage device and to add to that image and store the image that is the processing result of the backward shift+upsampling module 113. This operation corresponds to the calculation of Σ in expression (29), expression (30), expression (32) and expression (33).

The multiplying module 115 is connected to the accumulative adding module 114 and the adding module 117. The multiplying module 115 multiplies a coefficient μ determined beforehand by the image that is the result of processing by the accumulative adding module 114 and delivers that result to the adding module 117.

The filter operation module 116 is connected to the adding module 117. The filter operation module 116 performs calculation resulting from expression (41). This becomes convolution operation with respect to the image. It is ordinary FIR (Finite Impulse Response) filter operation. I in expression (41) is a unit matrix.

$$(I - \nu C^T C)\hat{z}_j \quad (41)$$

The adding module 117 is connected to the multiplying module 115 and the filter operation module 116. The adding module 117 adds the image that is the result of processing by the multiplying module 115 and the image that is the result of processing by the filter operation module 116 to determine expression (35), which is the output of the z-update processing module 110.

After this, the end judging module 120 controls to repeat the processing inside the z-update processing module 110 (the shift+downsampling module 111, the difference module 112, the backward shift+upsampling module 113, the accumulative adding module 114, the multiplying module 115, the filter operation module 116 and the adding module 117). More specifically, the end judging module 120 uses the image that is the result of processing by the adding module 117 as a processing target image in the shift+downsampling module 111 and causes repetitive processing to be performed in accordance with the aforementioned loop end judgment.

3.3. Other Exemplary Embodiments 3.3.1. Ratio of Resolution Between Image after Super-Resolution and Received Images $y_k$ May Differ Per Received Image In the preceding exemplary embodiment, description was given assuming that the ratio (or enlargement factor) of resolution between the image after super-resolution and the received images $y_k$ is constant.

However, even when the ratio of resolution between the image after super-resolution and the received images $y_k$ differs per received image, the description of the preceding exemplary embodiment can be utilized as is. What is different is that, as data that are accepted, the resolutions of the accepted images (or may also be the numbers of vertical and horizontal pixels of the accepted images, the ratio of resolution between the accepted images and the image after super-resolution, or the ratio of numbers of vertical and horizontal pixels between the accepted images and the image after super-resolution) may be added to the accepted images $y_k$ and the accepted image shift amounts $d_k$. Utilizing these pieces of information, the positional relationship between the pixel grid of the image (expression (34)) and the pixel grid of the image $y_k$ can be uniquely determined in the shift+downsampling module 111 and the backward shift+upsampling module 113. For that reason, the preceding exemplary embodiment can be utilized as is without changing it.

3.3.2. Changing Enlargement Operator

In the backward shift+upsampling module 113, when expression (32) or expression (33) is used, the image that is result of processing by the difference module 112 is enlarged and interpolated, that is, processing of the operator of expression (42) is performed.

$$F_k^T G_k \quad (42)$$

In the operator resulting from expression (42), a shift operation and an enlargement operation are performed. For this, it suffices to use general 2-dimensional interpolation processing (e.g., bilinear interpolation (linear interpolation), bicubic interpolation (cubic convolution interpolation), etc.). The difference value of expression (39) is an image with the number of pixels $M_k$, so it suffices to enlarge this image to an image with the number of pixels L. During enlargement, it suffices to determine the pixel values of the pixel positions of the enlarged image of the image with the number of pixels L.

3.3.3. Evaluation of End of Loop

The exemplary embodiment described in "3.2. Exemplary Embodiment" was one that realized expression (29), but when expression (30), expression (32) or expression (33) is used, evaluation (judgment) of the end of the loop is as follows.

3.3.3.1. When Using Expression (30)

The end of the loop when using expression (30) is evaluated using expression (43).

$$\sum_{k=1}^{N} [S_k^T(y_k - S_k \hat{z}_j)] \tag{43}$$

3.3.3.2. When Using Expression (32)

The end of the loop when using expression (32) is evaluated using expression (44).

$$\mu \sum_{k=1}^{N} [F_k^T G_k (y_k - S_k \hat{z}_j)] - \nu C^T C \hat{z}_j \tag{44}$$

3.3.3.3. When Using Expression (33)

The end of the loop when using expression (33) is evaluated using expression (45).

$$\sum_{k=1}^{N} [F_k^T G_k (y_k - S_k \hat{z}_j)] \tag{45}$$

3.3.4. Omission of Filter Operation Module 116 and Adding Module 117

When expression (30) or expression (33) is used, the filter operation module 116 and the adding module 117 are omitted. That is, the processing inside the z-update processing module 110 is performed by the shift downsampling module 111, the difference module 112, the backward shift+upsampling module 113, the accumulative adding module 114 and the multiplying module 115, and the end judging module 120 controls so as to repeat processing by these modules. More specifically, repetitive processing is performed in accordance with the preceding loop end evaluation using the image that is the result of processing by the multiplying module 115 as the processing target image in the shift+downsampling module 111.

3.3.5. Other

Moreover, the preceding configuration is one example. In actuality, any configuration that can realize calculation of any of the expressions of expression (29), expression (30), expression (32) and expression (33) is acceptable. For example, the filter operation module 116 may be divided into four operations as in expression (46) and performed.

$a_0 = C\hat{z}_j$, $a_1 = C^T a_0$, $a_2 = \nu a_1$, $\hat{z}_j - a_2 \tag{46}$ Moreover, in the preceding description, the phrase downsampling or upsampling was used, but it is acceptable if the reduction factor or enlargement factor is 1. In other words, the phrases reduction and enlargement include a case where the reduction factor or the enlargement factor is 1, and in these cases nothing is done.

4. Comparison with Method Described in "A Fast Super-Resolution Reconstruction Algorithm for Pure Translational Motion and Common Space-Invariant Blur"

When compared with the high-speed method described in "A Fast Super-Resolution Reconstruction Algorithm for Pure Translational Motion and Common Space-Invariant Blur", there is an advantage in terms of versatility. The invention can handle cases where positional shift occurs with relatively real number precision in the accepted images. Further, the invention can handle cases where the reduction factor of the accepted images differs. Moreover, a smooth image can be generated even when R is not nonsingular.

There is an advantage in terms of high speed with the general method described in "A Fast Super-Resolution Reconstruction Algorithm for Pure Translational Motion and Common Space-Invariant Blur". Expression (9) and expression (29) will be compared.

In expression (9), it is necessary to perform the operations below per 1-time iterative operation. Below, an accumulative number is employed as an approximate estimate of the operation load.

(A) Image Parallel Shift Operation $F_k$

The parallel shift amount is real number precision, so it is necessary to compute the pixel values of the pixel positions present between the pixel grids using plural pixels. f represents an accumulative number necessary in order to compute the pixel value after parallel shift of 1 pixel. Operation of fL times is necessary in all. For example, when 2-dimensional linear interpolation is performed, accumulation of f=4 times is performed per 1 pixel, so operation of 4L times is necessary.

(B) Operation $H_k$

This becomes a linear convolution operation. For example, when using an h×h kernel filter, accumulation of $h^2 L$ times is necessary. However, it suffices for the output value to correspond to the data after reduction. By combining with downsampling, the number of times of operation becomes $h^2 M_k$ times.

(C) Downsampling $D_k$ (D) Calculation of Difference with Accepted Images $y_k$ (E) Enlargement Zero-Fill Sampling (Expression (47))

$$D_k^T \tag{47}$$

This is processing that returns the preceding difference value to pixels for which sampling was performed during downsampling. Pixels for which sampling was not performed during downsampling are zero-filled.

(F) Operation (Expression (48))

$$H_k^T \tag{48}$$

This becomes a linear convolution operation. Similar to operation $H_k$, accumulation of $h^2 L$ times is necessary.

(G) Image Parallel shift Operation (Expression (49))

$$F_k^T \tag{49}$$

This is an operation that returns movement performed by $F_k$ to normal. For this also, an operation such as 2-dimensional linear interpolation is necessary. Similar to $F_k$, operation of fL times is necessary.

Moreover, it is necessary to compute the preceding (A) to (G) with respect to each k.

In the case of a number of times of iteration Q, a total number Jo of accumulation becomes as in expression (50).

$$J_0 = Q \left\{ NL(2f + h^2) + h^2 \sum_{k=1}^{N} M_k \right\} \qquad (50)$$

In contrast, an operation that is necessary to perform per 1-time iteration by expression (29) is as follows.
1. Image parallel shift+downsampling operation $S_k$
It suffices to perform interpolation only with respect to reduced images, so accumulation of $fM_k$ times is necessary.
2. Calculate difference with accepted images $y_k$.
3. Image parallel shift+upsampling operation (expression (51))

$$S_k^T \qquad (51)$$

Accumulation of $fM_k$ times is necessary.
4. Filter Operation
Assuming a filter of g taps per 1 pixel, operation of 2gL times is necessary.

Moreover, the number of times of blur reconstruction filter operation that is performed after iteration end is h2L times. A total number Jp of accumulation becomes expression (52).

$$J_P = Q \left\{ 2f \left( \sum_{k=1}^{N} M_k \right) + 2gL \right\} + h^2 L \qquad (52)$$

Here, a typical numerical example will be described.
It is assumed that an enlargement magnification $\alpha = L/M_k$ is satisfied where $M_k$ is constant.
A ratio Jo/Jp of the number of times of accumulation becomes expression (53).

$$J_0 / J_P = \left[ Q \left\{ NL(2f + h^2) + h^2 \sum_{k=1}^{N} M_k \right\} \right] / \qquad (53)$$
$$\left[ Q \left\{ 2f \left( \sum_{k=1}^{N} M_k \right) + 2gL \right\} + h^2 L \right]$$
$$= \left[ \frac{h^2}{2f} + \alpha \left( 1 + \frac{h^2}{2f} \right) \right] / \left[ 1 + \frac{\alpha}{N} \left( \frac{g}{f} + \frac{1}{Q} \frac{h^2}{2f} \right) \right]$$

It will be assumed that number of accepted images (N)=8, 2×2 enlargement (i.e., α=4), 2-dimensional linear interpolation f=4, number of blur filter taps h=5, and number of highpass filter taps g=4. It will be assumed that the number of times of iteration Q is 10 times. In this case, the ratio Jo/Jp of the number of times of accumulation becomes expression (54).

$$J_o/J_p \approx 11.85 \qquad (54)$$

That is, in the exemplary embodiment, the operation amount becomes reduced to about 1/12.

An example of the hardware configuration of the image processing apparatus of the present exemplary embodiment will be described with reference to FIG. 5. The configuration shown in FIG. 5 is, for example, configured by a personal computer (PC) or the like and represents an example of a hardware configuration that is equipped with a data reading unit 517 such as a scanner and a data output unit 518 such as a printer.

A CPU (Central Processing Unit) 501 is a control unit that executes processing according to a computer program in which is described an execution sequence of the various modules described in the preceding exemplary embodiment, that is, the z-update processing module 110, the end judging module 120, the blur reconstruction filter module 130 and the like.

A ROM (Read-Only Memory) 502 stores programs and operation parameters that the CPU 501 uses. A RAM (Random Access Memory) 503 stores programs used in the execution of the CPU 501 and parameters that appropriately change in that execution. These are interconnected by a host bus 504 configured by a CPU bus or the like.

The host bus 504 is connected to an external bus 506 such as a PCI (Peripheral Component Interconnect/Interface) bus via a bridge 505.

A keyboard 508 and a pointing device 509 such as a mouse are input devices that are operated by an operator. A display 510 has a liquid crystal display device or a CRT (Cathode Ray Tube) and displays various information as text and image information.

An HDD (hard disk drive) 511 has a built-in hard disk, drives the hard disk, and records or plays back information and programs executed by the CPU 501. Target images and super-resolution images are stored in the hard disk. Moreover, various computer programs such as other various data processing programs are stored.

A drive 512 reads data or programs recorded in a removable recording medium 513 such as a magnetic disk, an optical disk, a magnetic optical disk or a semiconductor memory and supplies the data and programs to the RAM 503 via an interface 507, the external bus 506, the bridge 505 and the host bus 504. The removable recording medium 513 is also utilizable as a data recording area that is the same as the hard disk.

A connection port 514 is a port to which an externally connected device 515 connects and has a connection component such as USB or IEEE 1394. The connection port 514 is connected to the interface 507 and to the CPU 501 and the like via the external bus 506, the bridge 505 and the host bus 504. A communication component 516 is connected to a network and executes data communication processing with the outside. The data reading unit 517 is a scanner, for example, and executes document reading processing. The data output unit 518 is a printer, for example, and executes document data output processing.

It will be noted that the hardware configuration of the image processing apparatus shown in FIG. 5 represents one configural example and that the present exemplary embodiment is not limited to the configuration shown in FIG. 5; it suffices for the configuration to be capable of executing the modules described in the present exemplary embodiment. For example, some modules may be configured by dedicated hardware (e.g., an Application Specific Integrated Circuit, or ASIC), some modules may be configured such that they are located in an outside system and connected by a communication line, or several of the systems shown in FIG. 5 may be connected to each other by a communication line and operate cooperatively with each other. Further, some modules may be incorporated into a copier, a facsimile machine, a scanner, a printer or a multifunctional machine (an image processing apparatus that has two or more functions of a scanner, a printer, a copier and a facsimile machine).

It will be noted that, although the preceding embodiment has been described using numerical expressions, equivalents of those numerical expressions are included in the numerical expressions. The equivalents may, in addition to being numerical expressions themselves, be transformations of numerical expressions that do not affect the final result, and solving numerical expressions by algorithmic solutions is also included.

It will be noted that the described program may be stored in a recording medium and provided or that program may be supplied by communicating means. In that case, the described program may be presumed as an invention of "a computer readable recording medium in which is recorded a program".

The "computer readable recording medium in which is recorded a program" refers to a computer readable recording medium in which is recorded a program and which is used in order to install and execute a program and distribute a program.

It will be noted that the recording medium may, for example, include DVD-R, DVD-RW and DVD-RAM that are digital versatile discs (DVD) and are specifications formulated by the DVD Forum, DVD+R and DVD+RW that were formulated by DVD+RW, compact discs (CD) such as read-only memory CDs (CD-ROM), recordable CDs (CD-R) and rewritable CDs (CD-RW), Blu-Ray Discs (registered trademark), magnetic optical disks (MO), flexible disks (FD), magnetic tape, hard disks, read-only memories (ROM), electrically erasable programmable read-only memories (EEPROM), flash memories, and random access memories (RAM).

Additionally, the program or some of the program may be recorded in the recording medium and saved or circulated. Further, the program may be transmitted by communication using a transmission medium such as, for example, a wired network that is used in a local area network (LAN), a metropolitan area network (MAN), a wide area network (WAN), the Internet, an intranet or an extranet, or a radio communication network, or a combination of these, or the program or some of the program may be placed on carrier waves and carried.

Moreover, the program may be part of another program or may be recorded in a recording medium together with a separate program. Further, the program may be divided and recorded in several recording media. Further, the program may be recorded in whatever configuration, such as being compressed or encrypted, as long as it is recoverable.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the skilled in the art to understand the invention for various embodiments and with the various modifications as are suited to the particular use contemplated. It is intended that the scope of the invention be defined by the following claims and their equivalents.

What is claimed is:

1. An image processing apparatus, comprising:
an image accepting unit that accepts a plurality of images;
a moving amount accepting unit that accepts a moving amount of each image that has been accepted by the image accepting unit;
an initial estimated image generating unit that generates an initial estimated image on the basis of the images that have been accepted by the image accepting unit and the moving amounts that have been accepted by the moving amount accepting unit;
a moving and reducing unit that moves and reduces the initial estimated image;
a difference extracting unit that extracts a difference image between an image that is a result of processing by the moving and reducing unit and the images that have been accepted by the image accepting unit;
a moving and enlarging unit that moves and enlarges, in the opposite direction of the moving and reducing unit, the difference image that is a result of processing by the difference extracting unit;
an accumulative adding unit that adds to an accumulated image and accumulates, an image that is a result of processing by the moving and enlarging unit;
a coefficient multiplying unit that multiplies a coefficient determined beforehand by an image that is a result of processing by the accumulative adding unit;
an iterating unit that uses an image that is a result of processing by the coefficient multiplying unit as the estimated image and causes processing by the moving and reducing unit, the difference extracting unit, the moving and enlarging unit, the accumulative adding unit and the coefficient multiplying unit to be iteratively performed in accordance with a condition determined beforehand; and
an output unit that outputs an image that is a result of iterative processing by the iterating unit.

2. The image processing apparatus according to claim 1, further comprising: a high region enhancing unit that performs processing that enhances a high frequency region with respect to the image that is the result of iterative processing by the iterating unit,
wherein the output units outputs an image that is a result of processing by the high frequency region enhancing unit.

3. The image processing apparatus according to claim 1, further comprising: a convolution operation unit that performs a convolution operation with respect to the estimated image and an adding unit that adds an image that is a result of processing by the convolution operation unit and the image that is the result of processing by the coefficient multiplying unit,
wherein the iterating unit uses an image that is a result of processing by the adding unit as the estimated image and causes processing by the moving and reducing unit, the difference extracting unit, the moving and enlarging unit, the accumulative adding unit, the coefficient multiplying unit and the adding unit to be iteratively performed in accordance with a condition determined beforehand.

4. The image processing apparatus according to claim 2, further comprising: a convolution operation unit that performs a convolution operation with respect to the estimated image and an adding unit that adds an image that is a result of processing by the convolution operation unit and the image that is the result of processing by the coefficient multiplying unit,
wherein the iterating unit uses an image that is a result of processing by the adding unit as the estimated image and causes processing by the moving and reducing unit, the difference extracting unit, the moving and enlarging unit, the accumulative adding unit, the coefficient multiplying unit and the adding unit to be iteratively performed in accordance with a condition determined beforehand.

5. The image processing apparatus according to claim 1, wherein the moving and enlarging unit inserts zero and performs enlargement for pixels that were not extracted by the moving and reducing unit.

6. The image processing apparatus according to claim 2, wherein the moving and enlarging unit inserts zero and performs enlargement for pixels that were not extracted by the moving and reducing unit.

7. The image processing apparatus according to claim 1, wherein the moving and enlarging unit enlarges and interpolates the image that is the result of processing by the difference extracting unit.

8. The image processing apparatus according to claim 2, wherein the moving and enlarging unit enlarges and interpolates the image that is the result of processing by the difference extracting unit.

9. The image processing apparatus according to claim 3, wherein the moving and enlarging unit enlarges and interpolates the image that is the result of processing by the difference extracting unit.

10. The image processing apparatus according to claim 4, wherein the moving and enlarging unit enlarges and interpolates the image that is the result of processing by the difference extracting unit.

11. An image processing method using an image processing apparatus, the image processing apparatus having an image accepting unit, a moving amount accepting unit, an initial estimated image generating unit, a moving and reducing unit, a difference extracting unit, a moving and enlarging unit, an accumulative adding unit, a coefficient multiplying unit, an iterating unit, an output unit, a high region enhancing unit, a convolution operation unit, and an adding unit, the method comprising:
   accepting a plurality of images using the image accepting unit;
   accepting a moving amount of each image that has been accepted using the moving amount accepting unit;
   generating an initial estimated image on the basis of the images that have been accepted and the moving amounts that have been accepted using the initial estimated image generating unit;
   moving and reducing an estimated image using the moving and reducing unit;
   extracting a difference image between an image that is a result of processing in the moving and reducing step and the images that have been accepted in the image accepting step using the difference extracting unit;
   moving and enlarging, in the opposite direction of the moving and reducing, the difference image that is a result of processing using the moving and enlarging unit;
   adding to an accumulated image, and accumulating an image that is a result of processing using the accumulative adding unit;
   multiplying a coefficient determined beforehand by an image that is a result of processing using the coefficient multiplying unit;
   with use of an image that is a result of processing in the coefficient multiplying step as the estimated image, iterating processing in the moving and reducing step, the difference extracting step, the moving and enlarging step, the accumulative adding and the coefficient multiplying step in accordance with a condition determined beforehand using the iterating unit; and
   outputting an image of a result of having been iteratively processed in the iterating step using the output unit.

12. The method according to claim 11, further comprising: performing processing that enhances a high frequency region with respect to the image that is the result of iterative processing by the iterating unit using the high region enhancing unit, and
   outputting an image that is a result of processing by the high frequency region enhancing unit using the output unit.

13. The method according to claim 11, further comprising: performing a convolution operation with respect to the estimated image using the convolution operation unit and adding an image that is a result of processing by the convolution operation unit and the image that is the result of processing by the coefficient multiplying unit using the adding unit, and
   using an image that is a result of processing by the adding unit as the estimated image and causing processing by the moving and reducing unit, the difference extracting unit, the moving and enlarging unit, the accumulative adding unit, the coefficient multiplying unit and the adding unit to be iteratively performed in accordance with a condition determined beforehand using the iterating unit.

14. The method according to claim 12, further comprising: performing a convolution operation with respect to the estimated image using the convolution operation unit and adding an image that is a result of processing by the convolution operation unit and the image that is the result of processing by the coefficient multiplying unit using the adding unit, and
   using an image that is a result of processing by the adding unit as the estimated image and causing processing by the moving and reducing unit, the difference extracting unit, the moving and enlarging unit, the accumulative adding unit, the coefficient multiplying unit and the adding unit to be iteratively performed in accordance with a condition determined beforehand using the iterating unit.

15. A non-transitory computer readable storage medium storing a program causing a computer to execute a process for processing an image using an image processing apparatus, the image processing apparatus having an image accepting unit, a moving amount accepting unit, an initial estimated image generating unit, a moving and reducing unit, a difference extracting unit, a moving and enlarging unit, an accumulative adding unit, a coefficient multiplying unit, an iterating unit, an output unit, a high region enhancing unit, a convolution operation unit, and an adding unit, the process comprising:
   accepting a plurality of images using the image accepting unit;
   accepting a moving amount of each image that has been accepted in the image accepting step using the moving amount accepting unit;
   generating an initial estimated image on the basis of the images that have been accepted in the image accepting step and the moving amounts that have been accepted in the moving amount accepting step using the initial estimated image generating unit;
   moving and reducing an estimated image using the moving and reducing unit;
   extracting a difference between an image that is a result of processing in the moving and reducing step and the images that have been accepted in the image accepting step using the difference extracting unit;
   moving and enlarging, in the opposite direction of the moving and reducing step, the difference image that is a result of processing in the difference extracting step using the moving and enlarging unit;
   adding to an accumulated image, and accumulating an image that is a result of processing in the moving and enlarging step using the accumulative adding unit;
   multiplying a coefficient determined beforehand by an image that is a result of processing in the accumulative adding step using the coefficient multiplying unit;

with use of an image that is a result of processing in the coefficient multiplying step as the estimated image, iterating processing in the moving and reducing step, the difference extracting step, the moving and enlarging step, the accumulative adding step and the coefficient multiplying step in accordance with a condition determined beforehand using the iterating unit; and outputting an image of a result of having been iteratively processed in the iterating step using the output unit.

16. The process according to claim 15, further comprising: performing processing that enhances a high frequency region with respect to the image that is the result of iterative processing by the iterating unit using the high region enhancing unit, and outputting an image that is a result of processing by the high frequency region enhancing unit using the output unit.

17. The process according to claim 15, further comprising: performing a convolution operation with respect to the estimated image using the convolution operation unit and adding an image that is a result of processing by the convolution operation unit and the image that is the result of processing by the coefficient multiplying unit using the adding unit, and using an image that is a result of processing by the adding unit as the estimated image and causing processing by the moving and reducing unit, the difference extracting unit, the moving and enlarging unit, the accumulative adding unit, the coefficient multiplying unit and the adding unit to be iteratively performed in accordance with a condition determined beforehand using the iterating unit.

18. The process according to claim 16, further comprising: performing a convolution operation with respect to the estimated image using the convolution operation unit and adding an image that is a result of processing by the convolution operation unit and the image that is the result of processing by the coefficient multiplying unit using the adding unit, and using an image that is a result of processing by the adding unit as the estimated image and causing processing by the moving and reducing unit, the difference extracting unit, the moving and enlarging unit, the accumulative adding unit, the coefficient multiplying unit and the adding unit to be iteratively performed in accordance with a condition determined beforehand using the iterating unit.

* * * * *